(12) United States Patent
Chih

(10) Patent No.: US 6,520,121 B2
(45) Date of Patent: Feb. 18, 2003

(54) BENDABLE HARD TYPE WATER TUBE

(76) Inventor: Gordon Chih, No. 33, Tien-Yang Lane, Chao-An Li, Lu-Kang Chen, Changhua Hsien (TW)

( * ) Notice: Subject to any disclaimer, the term of this patent is extended or adjusted under 35 U.S.C. 154(b) by 0 days.

(21) Appl. No.: 10/006,227

(22) Filed: Dec. 10, 2001

(65) Prior Publication Data

US 2002/0170505 A1 Nov. 21, 2002

(30) Foreign Application Priority Data

May 18, 2001 (TW) .......................................... 090208166

(51) Int. Cl.⁷ ............................................... F22B 17/10
(52) U.S. Cl. ...................... 122/235.11; 285/18; 72/369
(58) Field of Search .......................... 122/94.1, 235.11, 122/235.14; 285/18; 72/367.1, 369; 138/177; 137/337, 339

(56) References Cited

U.S. PATENT DOCUMENTS 4,177,564 A * 12/1979 Flatland ........................ 433/82
4,696,494 A * 9/1987 Schmitz et al. ................ 285/18
6,164,562 A * 12/2000 Wu ........................ 137/625.44

* cited by examiner

Primary Examiner—Gregory Wilson
(74) Attorney, Agent, or Firm—Dennison, Schultz & Dougherty

(57) ABSTRACT

A bendable hard type water tube includes a first tube with one end installed with a first seat, a second tube having one end installed with a second seat, a first buckle, a second buckle, a rotary shaft installed between the second buckle and the first buckle, a third buckle, an elastic body. The outer sides of the first buckle, second buckle, and third buckle are formed with a plurality of teeth. A resisting portion is installed on the press and resists against the third buckle. When a force is applied to the press, the angle between the first tube and second tube can be changed. When the press is released, the first tube is buckled with the second tube so as to change the direction of water flow to match the requirement of spraying water.

12 Claims, 8 Drawing Sheets

BENDABLE HARD TYPE WATER TUBE

FIELD OF THE INVENTION

The present invention relates to a bending structure, and particularly to a bendable hard type water tube which can be bent at any time.

BACKGROUND OF THE INVENTION

Referring to FIG. 1, a bendable water spraying gun is partially illustrated. In this prior art design, two tubes A are used to connect the water inlet and water outlet of the gun. A threaded rod B is formed in one of the tube A for being engaged with the other tube A. Then a threaded rotary body C is used to connect the two. The connection of the two tubes have respective enclosing bodies D which are corresponding to each other and have respective inner spaces.

When the bending angle of the water outlet is adjusted, the water spraying gun is bent for conveniently cleaning a roof of a car. In the design, the water inlet is closed first, then the rotary body C is released and the two tube bodies A are rotated to desired positions. Then the rotary body C is rotated again to tighten the two enclosing body D. Then the water flow at the inlet is opened again.

The aforesaid operation needs not only more labor and time. It is often that as the water tube has been adjusted, it is found that the water tube is not suitable and thus it is necessary to further adjust it. This operation is performed repeatedly. Moreover, it is often that the thread is destroyed and thus the adjusting function cannot be worked, even it can not be used.

SUMMARY OF THE INVENTION

Accordingly, the primary object of the present invention is to provide a bendable hard type water tube, wherein the bending angle of the water tube is changeable with less time and force.

Another object of the present invention is to provide a bendable hard type water tube with a longer lifetime.

A further object of the present invention is to provide a bendable hard type water tube including a first tube with one end installed with a first seat, a second tube having one end installed with a second seat, a first buckle, a second buckle, a rotary shaft installed between the second buckle and the first buckle, a third buckle, an elastic body and a press. The outer sides of the first buckle, second buckle, and third buckle are formed with a plurality of teeth. A resisting portion is installed on the press and resists against the third buckle. When a force is applied to the press, the angle between the first tube and second tube can be changed. When the press is released, the first tube is buckled with the second tube so as to change the direction of water flow to match the requirement of spraying water.

The various objects and advantages of the present invention will be more readily understood from the following detailed description when read in conjunction with the appended drawing.

DETAILED DESCRIPTION OF THE PREFERRED EMBODIMENTS

Figure 1:
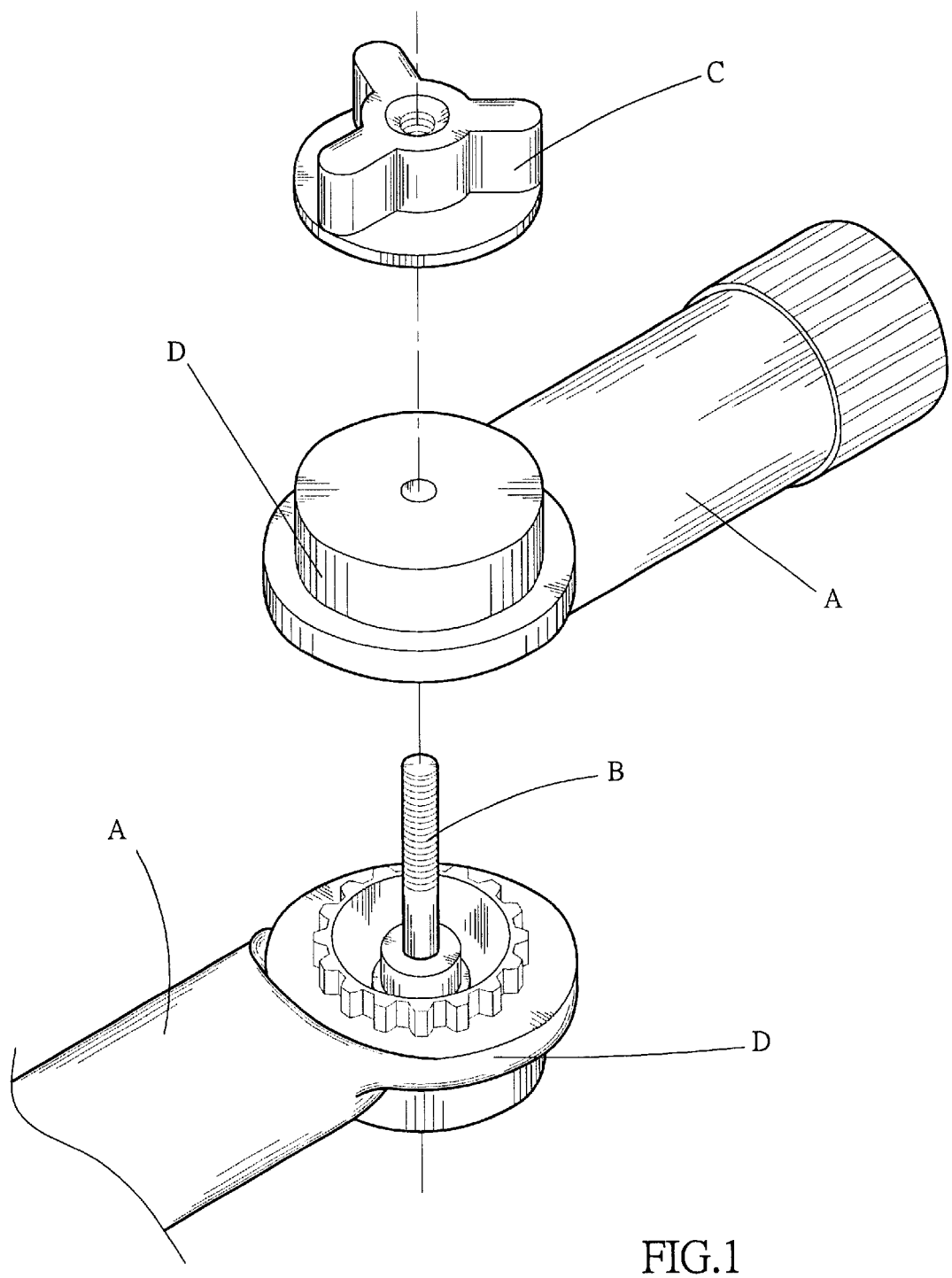
FIG. 1 is a schematic perspective view showing the connection structure of a water spraying gun.
Figure 2:
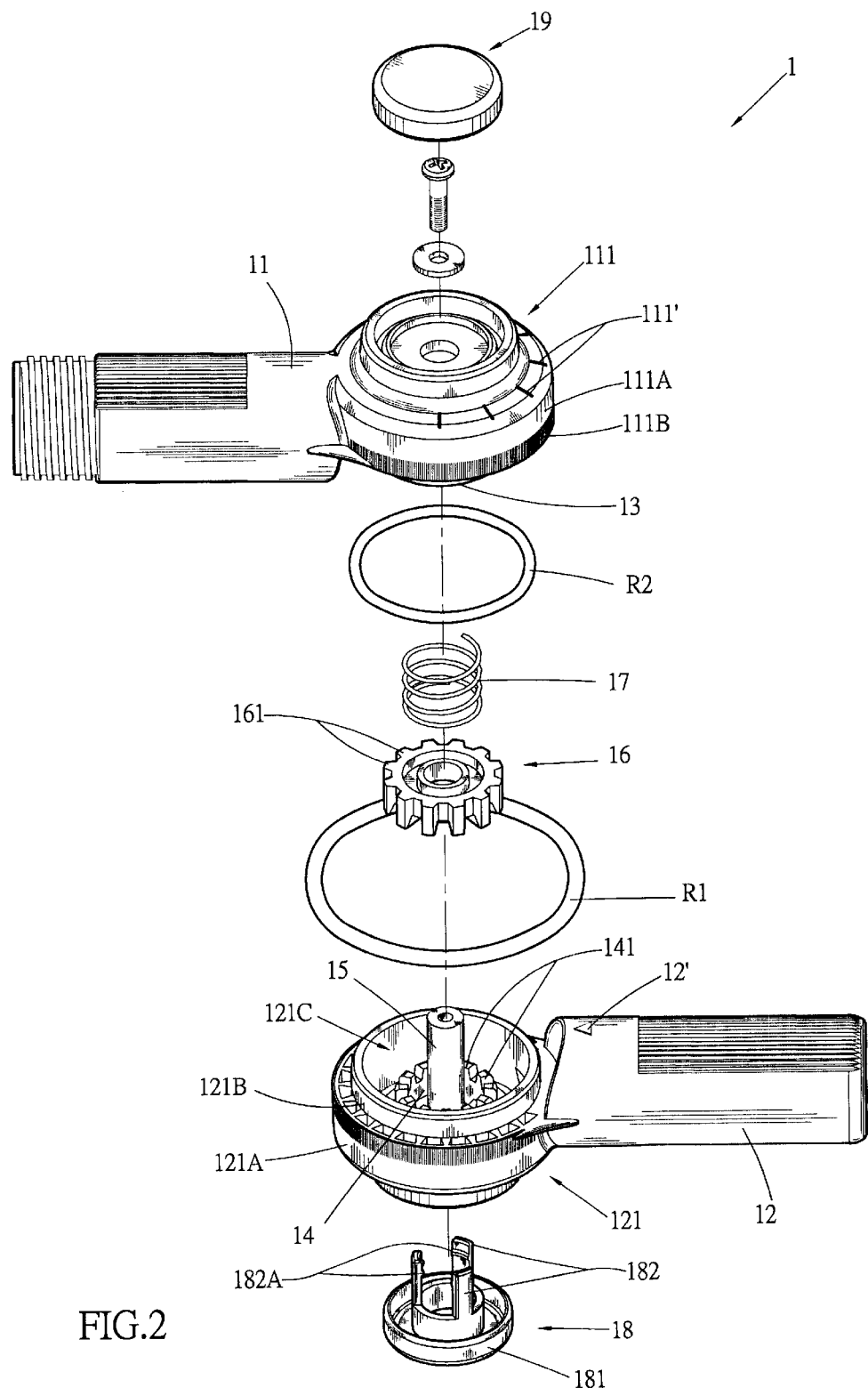
FIG. 2 is an exploded perspective view of the preferred embodiment of the present invention.
Figure 3:
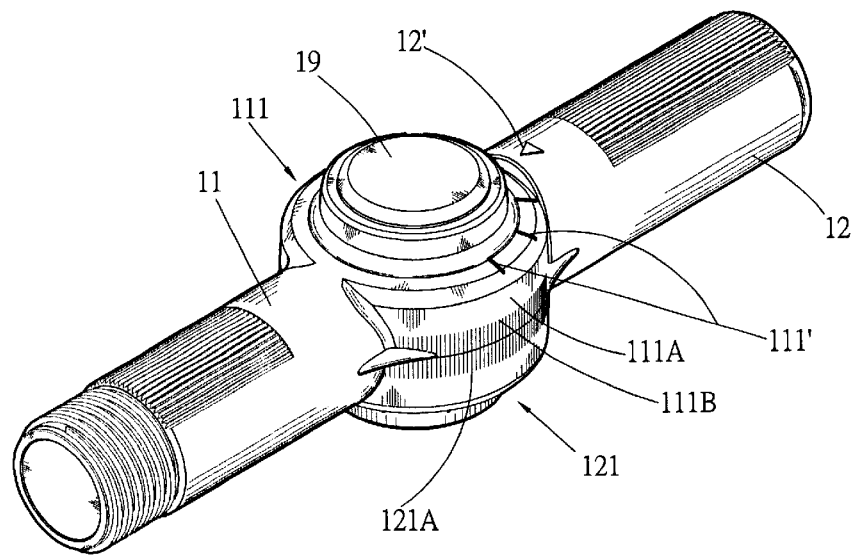
FIG. 3 is a schematic perspective view of the preferred embodiment of the present invention.
Figure 4:
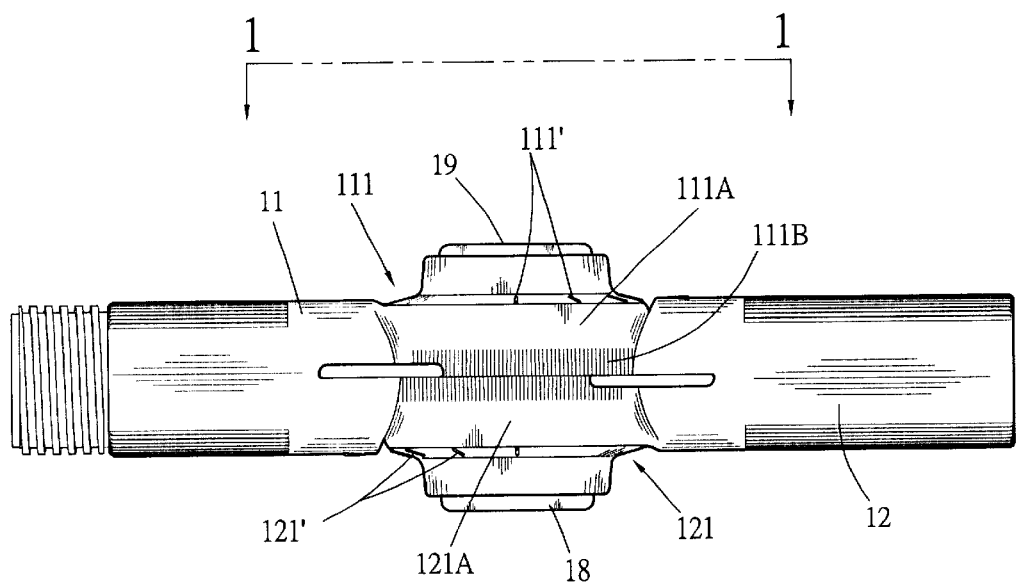
FIG. 4 is a front view of the preferred embodiment of the present invention.
Figure 5:
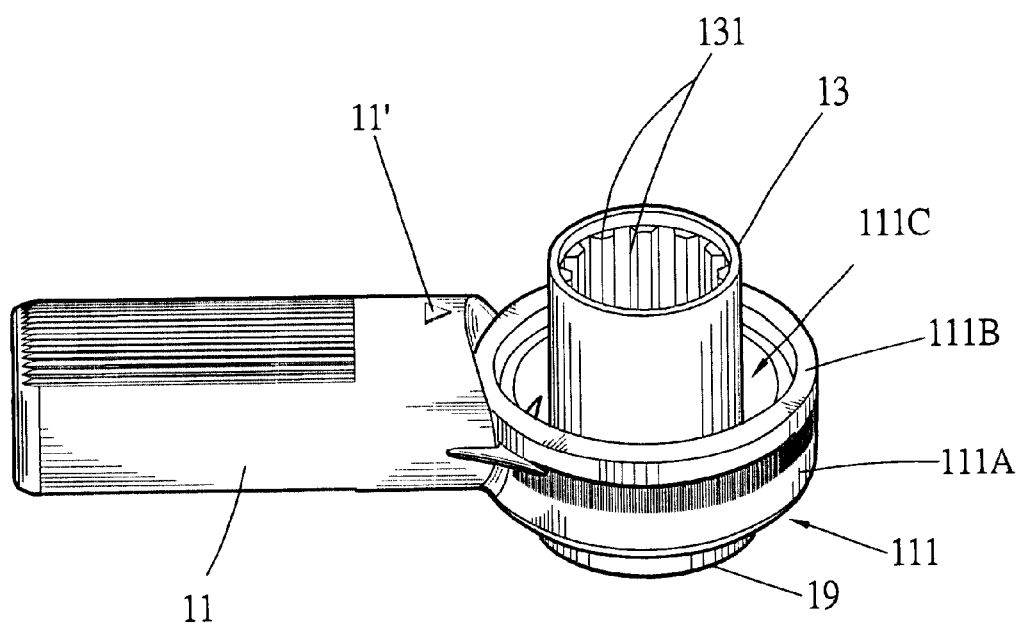
FIG. 5 is a plane schematic view of the first seat of FIG. 2.
Figure 6:
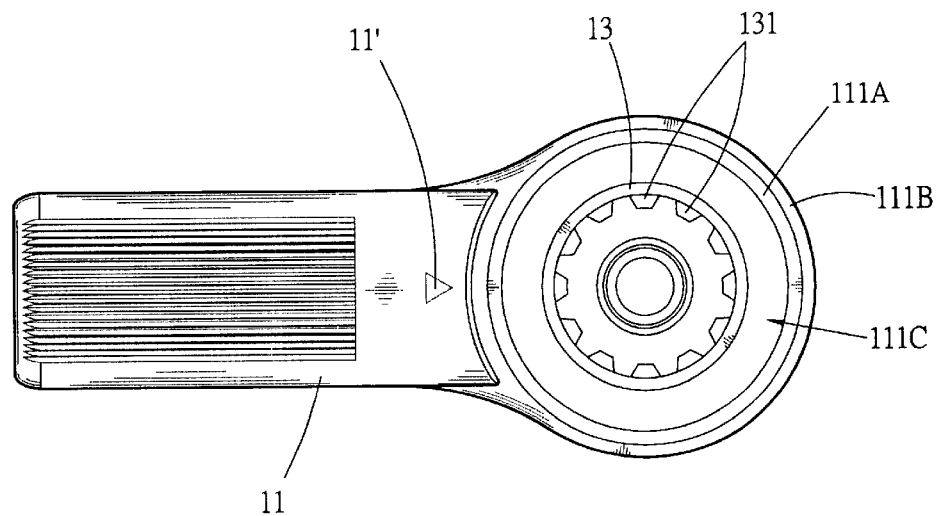
FIG. 6 is a bottom view of the first seat of FIG. 2.
Figure 7:
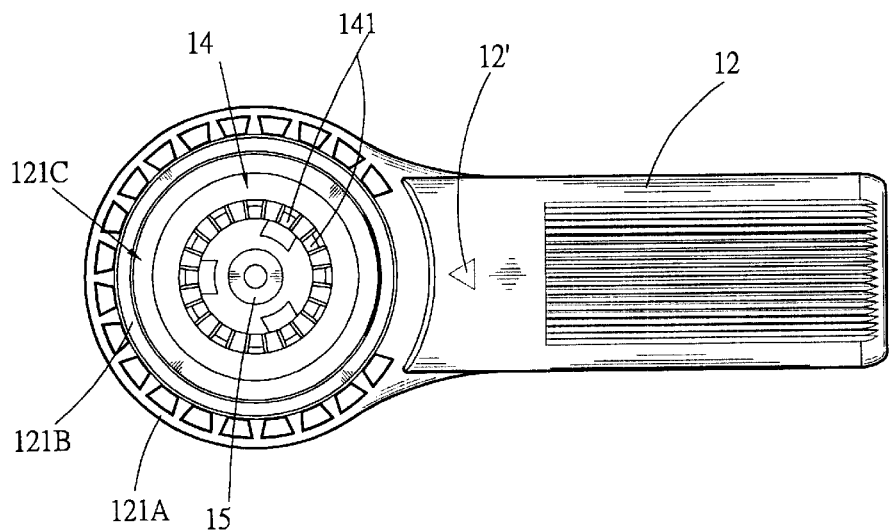
FIG. 7 is a top view of the second seat of FIG. 2.
Figure 8:
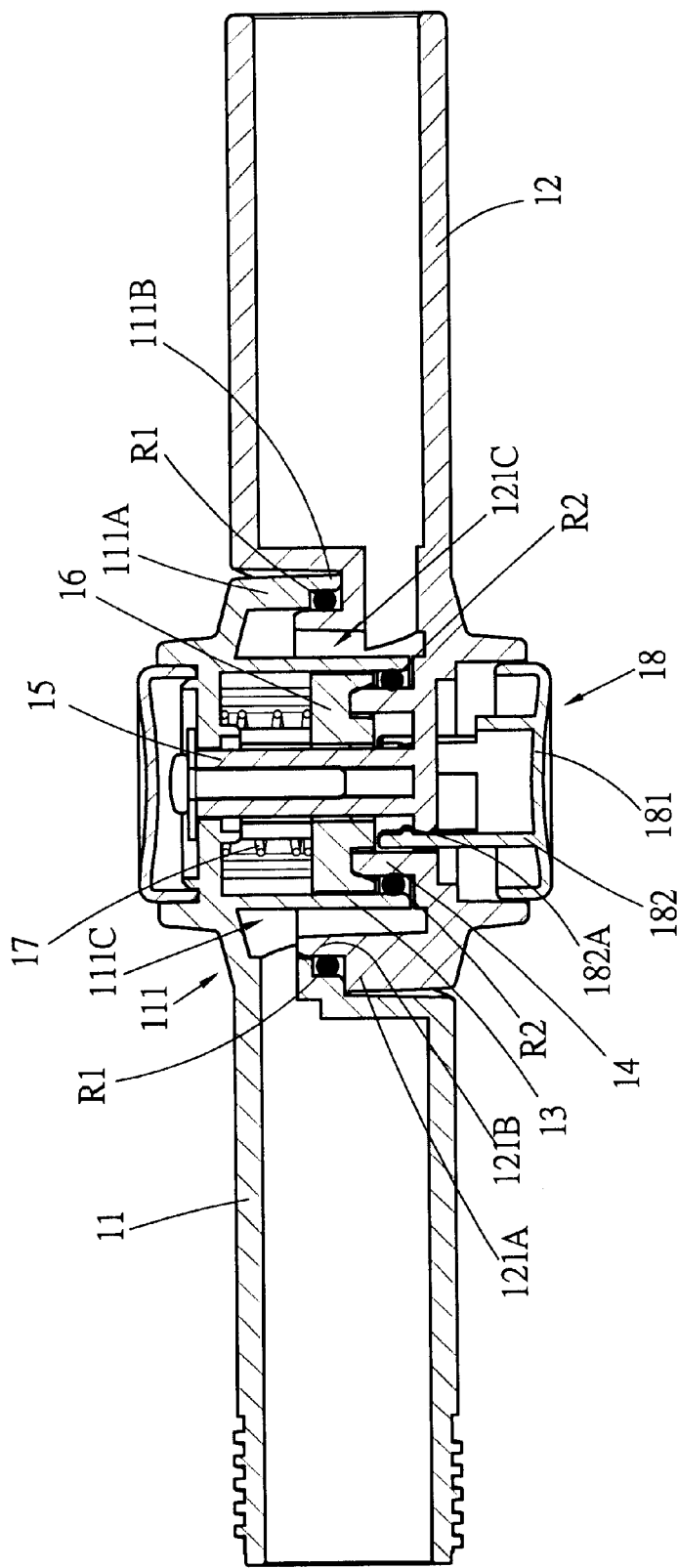
FIG. 8 is a cross section view along the direction of 1—1, wherein the press 18 of FIG. 4 dose not apply any force.
Figure 9:
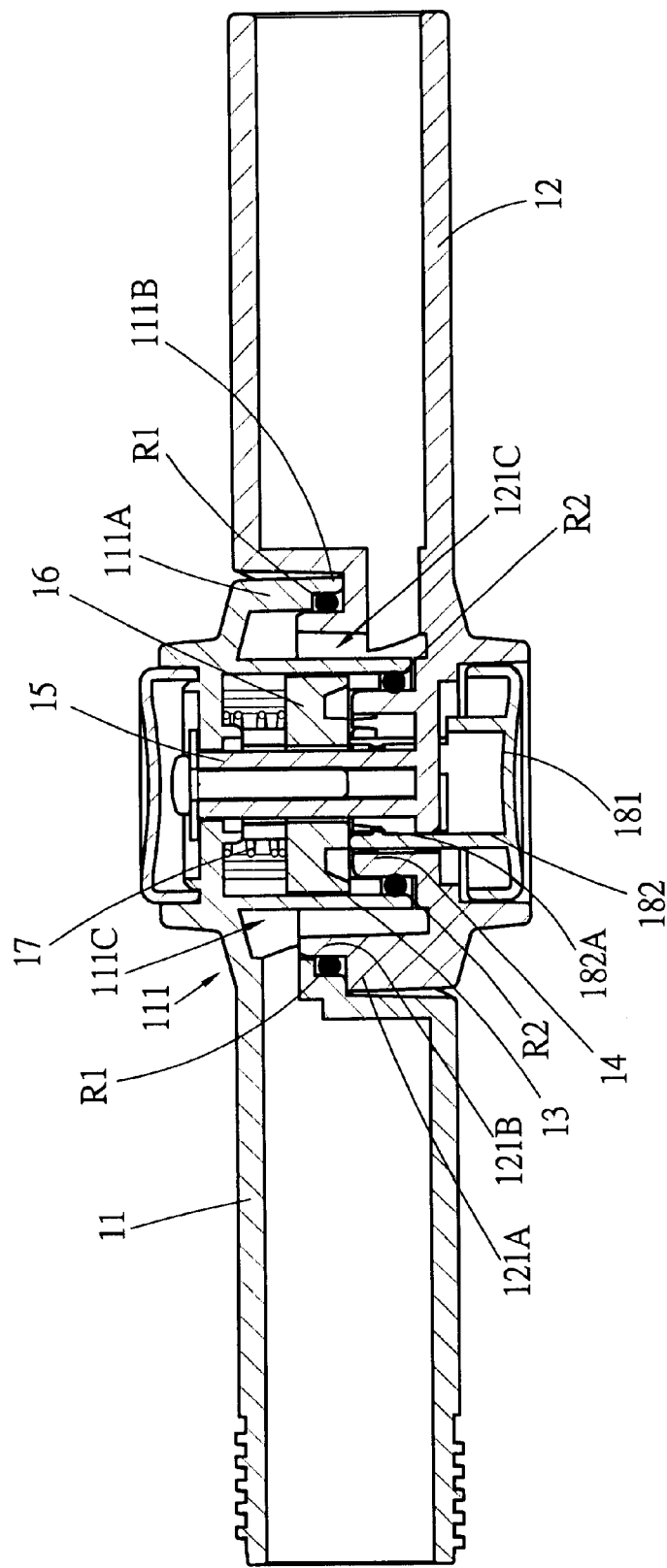
FIG. 9 is a cross section view along the direction of 1—1, wherein the press 18 of FIG. 4 applies a force.
Figure 10A:
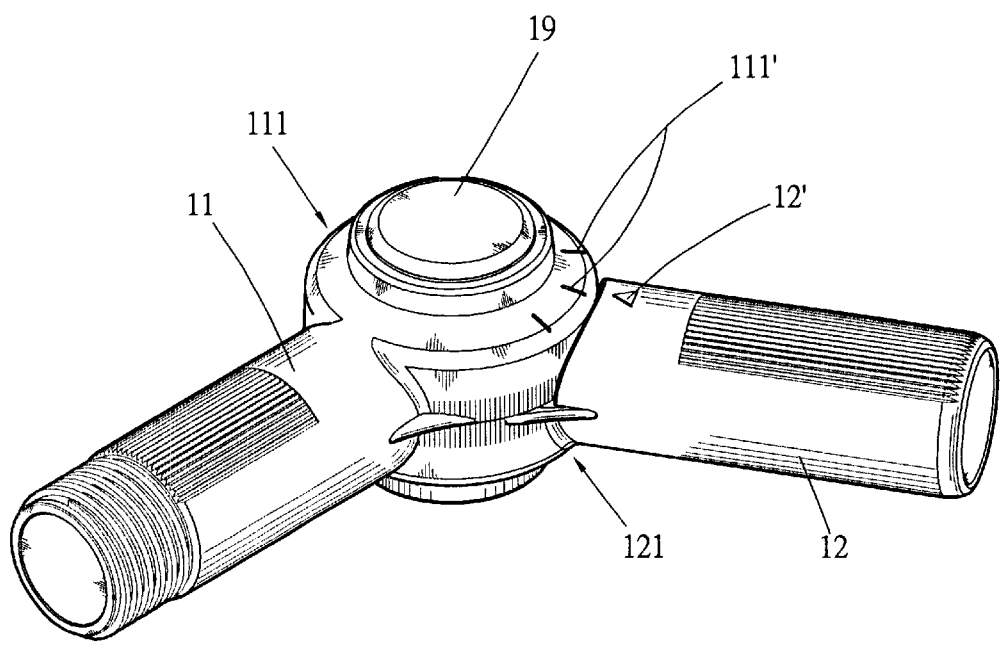
FIG. 10 is a schematic perspective view of the preferred embodiment of the present invention, wherein the present invention is in a bended condition.
Figure 10B:
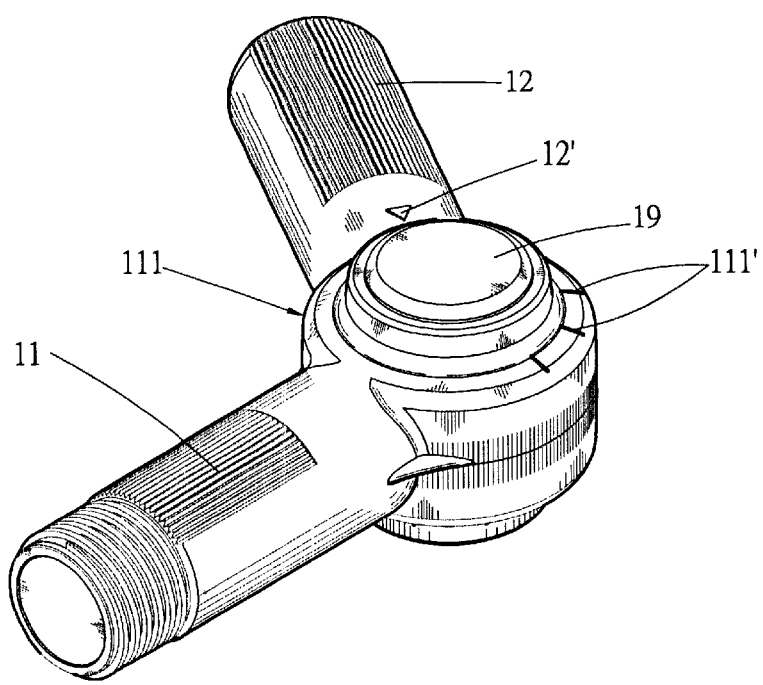

Referring to FIGS. 2 to 10, the bendable hard type water tube 1 of the present invention includes a first tube 11 with one end installed with a first seat 111, a second tube 12 having one end installed with a second seat 121, a first buckle 13, a second buckle 14, a rotary shaft 15, a third buckle 16, an elastic body 17 and a press 18.

The first seat 111 is a round piece-like body, and a predetermined portion on the periphery thereof is firmly secured to one end of the first tube 11. The periphery of the first seat 111 extends with a proper length vertically and is connected to the first tube 11 so as to be formed as a first outer side 111A. A top edge of the first outer side 111A is extended with a second outer side 111B having a proper height and having an inner diameter larger than that of the first outer side 111A. Thereby, a first water channel 111C is formed between the first seat 111 and the first and second outer sides 111A, 111B. An opening is formed at the connection of the first outer side 111A and the first tube 11 so as to communicate the first water channel 111C and the first tube 11.

The shape of the second seat 121 is approximately corresponding to the first seat 111. The predetermined portion at the periphery thereof is firmly secured to one end of the second tube 12. The periphery of the second seat is extended to a proper length vertically to be aforementioned as a first inner side 121A which is connected to the second tube 12. A top edge of the first inner side 121A is extended with a second inner side 121B having a proper height. The outer diameter of the second inner side 121B is smaller than the outer diameter of the first inner side 121A, but corresponding to the inner diameter of the first outer side 111A. Thereby, a second water channel 121C is formed between the second seat 121 and the first and second inner sides 121A and 121B. An opening is formed at the connection of the first inner side 121A and the second tube 12 so as to communicate the second water channel 121C and the second tube 12.

The second inner side 121B is inserted into the first outer side 111A with a proper depth so that the first outer side 111A encloses the second inner side 121B. The top edge of the second outer side 111B resists against the top edge of the first inner side 121A. Thereby, the interior of the first tube 11, the interior of the second tube 12, the first water channel 111C and the second water channel 121C are communicated with one another.

The first buckle 13 has a predetermined height and is a hollow cylinder. A plurality of radial teeth 131 are arranged at the periphery of the inner wall of the cylinder. One end thereof is firmly secured to the lateral side of the first seat 111 and is in the first water channel 111C. The other end thereof is an open end and resists against the second seat 121.

The second buckle 14 has a predetermined height and is a round ring with an outer radius smaller than the distance between the central axis of the first buckle 13 and the outer edge of the teeth 131. One end thereof is firmly secured to a lateral side of the second seat 121 and is in the second water channel 121B. The other end thereof is arranged with a plurality of teeth 141 which re arranged normally and along the periphery of the round ring.

The rotary shaft 15 is a round cylinder with a length approximately equal to the height of the first buckle 13. One end thereof is concentric with the second buckle 14 and they are firmly secured to the second seat 121 by the same side. The other end thereof is pivotally installed at the center of the connection between the first buckle 13 and the first seat 111.

The third buckle 16 has is a round cylinder with a predetermined height and coaxially encloses the rotary shaft 15. A plurality of teeth 161 are arranged at the lateral side along the circumference thereof. Each tooth 161 is corresponding to and engaged with the teeth 131, 141 of the first buckle 13 and the second buckle 14.

The elastic body 17 is installed between the first buckle 13 and the third buckle 16. Two ends thereof resists against the connecting end of the first buckle 13 and the third buckle 16.

The press 18 is installed at the second seat 121 at an opposite side of the second buckle 14 and includes a cover 181 and a resisting portion 182.

The resisting portion 182 is a rod protruded with a predetermined length toward the second seat 121 at a predetermined portion at the lateral side of the cover 181. The resisting portion 182 passes through an opening installed at the second seat 121 and is between the second buckle 14 and the rotary shaft 15. Thereby, the press 18 may move reciprocally along the long axis of the rotary shaft and then push the third buckle 16 through the resisting portion 182.

There is a protrusion 182A installed on the predetermined position of the resisting portion 182 that passes through the second seat 121. The protrusion 182A is in order to prevent the press 18 dropping from the second seat 121.

By above structure, the first buckle 13, second buckle 14 and third buckle 16 are always engaged. The first tube 11 is buckled with the second tube 12. When the included angle between the first tube 11 and the second tube 12 is necessary to be changed, a pressure can be applied to the press 18 so that the resisting portion 182 resists against the third buckle 16, and thus the third buckle 16 is separated from the second buckle 14. Then, the first tube 11 may have an angle displacement with respect to the second tube 12. Then, the press 18 is released. The pressed elastic body 17 restores the third buckle 16 to engage the second buckle 14. Thereby, the operation is completely easily.

The bendable hard type water tube of the present invention has the following features:

1. The folding and buckling operation can be positioned easily.
2. In changing the flow direction of a water spraying gun, the water flow is unnecessary to be closed.
3. The problem of thread deformation or too-tight-buckling as in the prior art will not occur in the present invention.

In the present invention, the resisting portion 182 is formed by three rods that are formed along a circumference.

In the present invention, the first seat 111 corresponding to the rotary shaft 15 is installed an opening, and a screw passes through the opening to connect the rotary shaft 15. A pad encloses the screw.

In the present invention, the elastic body 17 is a helical spring.

In the present invention, the first seat 111 at opposite of the first buckle 13 installs a covering body 19 for presenting a beautiful outlook.

In the present invention, at the outer lateral surfaces of the first tube 11 and the second tube 12 are formed with indicators 11' and 12', for example, arrows, and outer surfaces of the first seat 111 and second seat 121 are formed with indicators 111' and 121', for example scales, for indicating bending angles.

In above structure, the outer side of the second inner side 121B and the outer side of the second buckle 14 are installed with an outer draining-proof washer R1 and an inner drainproof washer R2 for tightly sealing water.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A bendable hard type water tube comprising:
   a first tube;
   a second tube;
   a first seat being a round piece-like body, and a predetermined portion on a periphery thereof being firmly secured to one end of the first tube; a first outer side extending from a periphery of the first seat and being connected to the first tube; a top edge of the first outer side being extended with a second outer side having a proper height and having an inner diameter larger than that of the first outer side; thereby, a first water channel being formed between the first seat and the first and second outer sides; an opening being formed at a connection of the first outer side and the first tube so as to communicate the first water channel and the first tube;
   a second seat having a shape approximately corresponding to the piece-like body of the first seat; a predetermined portion at the periphery thereof being firmly secured to one end of the second tube; a periphery of the second seat being extended to a predetermined length vertically to be aforementioned as a first inner side which being connected to the second tube; a top edge of the first inner side being extended with a second inner side having a predetermined height; an outer diameter of the second inner side being smaller than an outer diameter of the first inner side, but corresponding to an inner diameter of the first outer side; thereby, a second water channel being formed between the second seat and the first and second inner sides; an opening being formed at a connection of the first inner side and the second tube so as to communicate the second water channel and the second tube;
   a second inner side being inserted into the first outer side with a predetermined depth so that the first outer side encloses the second inner side; a top edge of the second outer side resisting against a top edge of the first inner side; thereby, an interior of the first tube, an interior of the second tube, the first water channel and the second water channel being communicated with one another;

a first buckle having a predetermined height and being a hollow cylinder; a plurality of radial teeth being arranged at a periphery of an inner wall of the cylinder; one end thereof being firmly secured to a lateral side of the first seat and being in the first water channel; the other end thereof being an open end and resisting against the second seat;

a second buckle having a predetermined height and being a round ring with an outer radius smaller than the distance between the central axis of the first buckle and an outer edge of the teeth; one end thereof being firmly secured to a lateral side of the second seat and in the second water channel; the other end thereof being arranged with a plurality of teeth that are arranged normally along a periphery of the round ring;

a rotary shaft being a round cylinder with a length approximately equal to the height of the first buckle; one end thereof being concentric with the second buckle and they are firmly secured to the second seat by the same side, the other end thereof being pivotally installed at a center of the connection between the first buckle and the first seat;

a third buckle being a round cylinder with a predetermined height and coaxially enclosing the rotary shaft; a plurality of teeth being arranged at a lateral side of a circumference thereof; each tooth being corresponding to and engaged with teeth of the first buckle and the second buckle;

an elastic body being installed between the first buckle and the third buckle; two end thereof resisting against a connecting end of the first buckle and the third buckle; and a press being installed at the second seat opposite the second buckle and including a cover and a resisting portion; wherein the resisting portion is a rod protruded with a predetermined length toward the second seat and being formed a predetermined portion at a lateral side of the cover; the resisting portion passes through an opening installed at the second seat and being located between the second buckle and the rotary shaft; thereby, the press moving reciprocally along a long axis of the rotary shaft and then pushing the third buckle through the resisting portion.

2. The bendable hard type water tube as claim in claim 1, wherein the resisting portion is formed by three rods which are formed along a circumference.

3. The bendable hard type water tube as claim in claim 1, wherein the resisting portion comprises a protrusion installed at the predetermined position of the resisting portion that passes through the second seat.

4. The bendable hard type water tube as claim in claim 1, wherein the first seat corresponding to the rotary shaft installs an opening, and a screw passes through the opening to connect the rotary shaft.

5. The bendable hard type water tube as claim in claim 4, wherein a pad encloses the screw.

6. The bendable hard type water tube as claim in claim 1, wherein the elastic body is a helical spring.

7. The bendable hard type water tube as claim in claim 1, wherein a covering body is formed on the first seat at an opposite side of the first buckle.

8. The bendable hard type water tube as claim in claim 1, wherein at the outer lateral surfaces of the first tube and the second tube are formed with indicators for indicating a bending angle.

9. The bendable hard type water tube as claim in claim 8, wherein the indicator is an arrow.

10. The bendable hard type water tube as claim in claim 8, wherein the indicator is a scale.

11. The bendable hard type water tube as claim in claim 1, wherein an outer side of the second inner side is installed with an outer draining-proof washer.

12. The bendable hard type water tube as claim in claim 1, wherein an outer side of the second buckle is installed with an inner drain-proof washer.

* * * * *